Patented Sept. 18, 1934

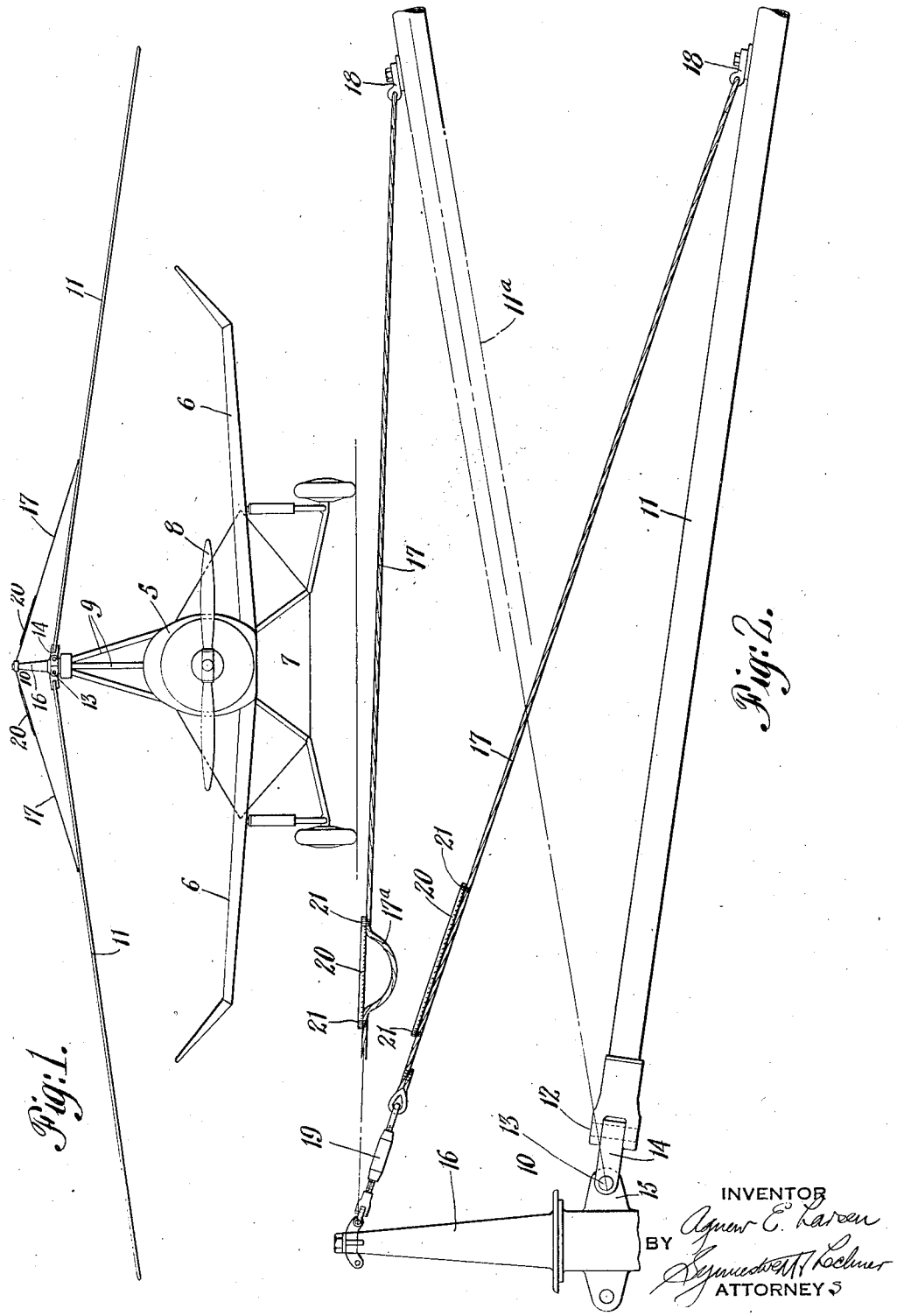

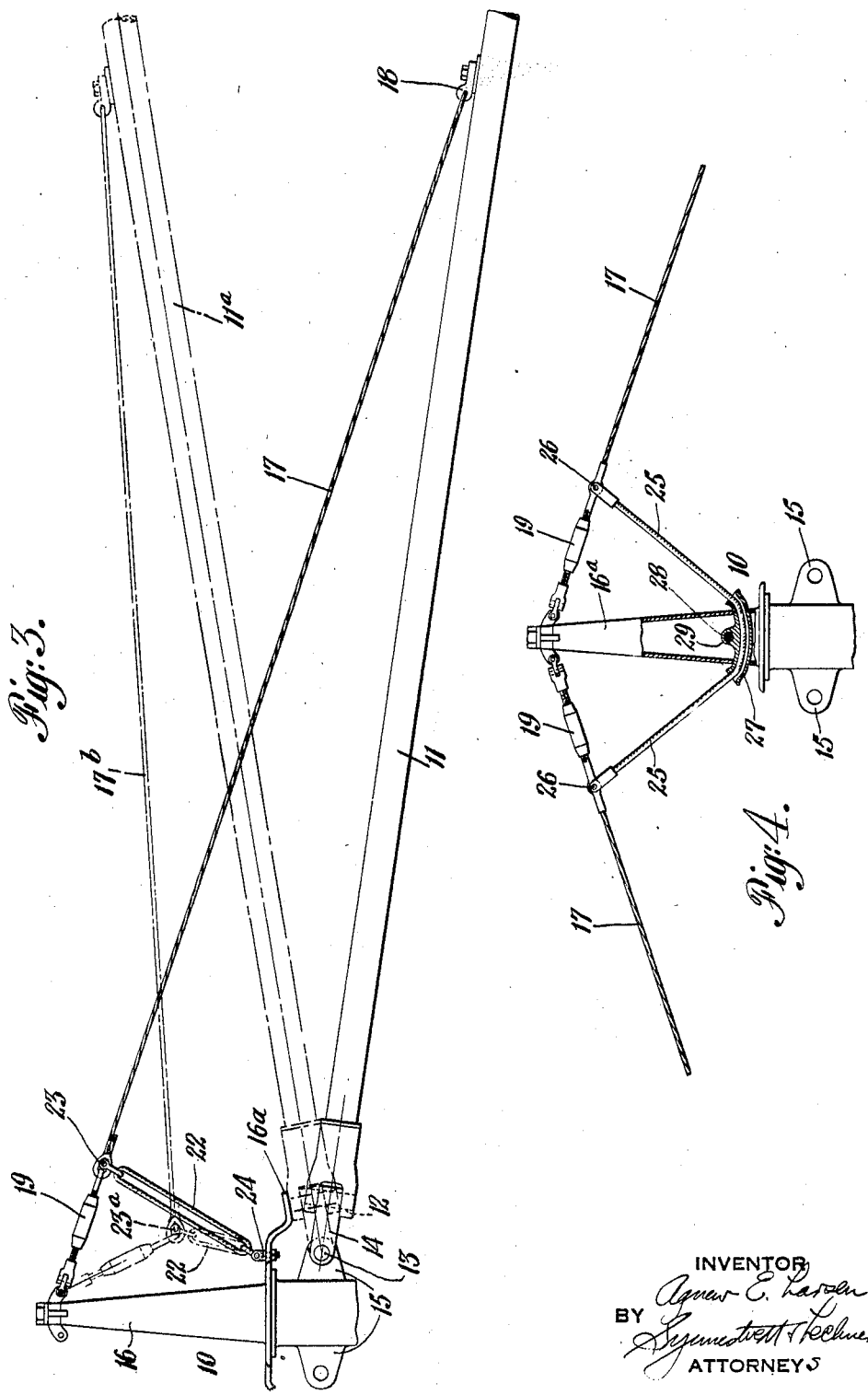

1,974,074

UNITED STATES PATENT OFFICE 1,974,074

AIRCRAFT SUSTAINING ROTOR

Agnew E. Larsen, Huntingdon Valley, Pa., assignor to Autogiro Company of America, Philadelphia, Pa., a corporation of Delaware Application May 22, 1931, Serial No. 539,239

11 Claims. (Cl. 244—19)

This invention relates to aircraft sustaining rotors and is more especially concerned with the type of rotor which includes a plurality of sustaining blades mounted for rotation about a common substantially vertically disposed axis and also for individual upward and downward swinging movements under the influence of various flight forces.

Still more particularly, the present invention deals with mechanism adapted to support the sustaining blades when they are not in flight operation.

With the foregoing in mind it should be noted that the present invention has in view the provision of a blade "droop" supporting mechanism which, in addition to providing for substantially unrestricted swinging movements in flight operation, also makes provision for taking up looseness or slack in the blade supporting elements during normal flight operation. In this way I am enabled to improve the construction and operation of aircraft of this type, particularly from the standpoint of aerodynamic efficiency.

Still further, in accordance with this invention, the blade droop supporting elements are more long-lived or durable, as the slack take-up means prevents vibration, flexing or "whipping" of the supporting elements during blade rotation.

The general nature of this invention and also objects and advantages in addition to those referred to above will be more apparent from a consideration of the following discussion making reference to the accompanying drawings, in which—

Figure 1 is a front elevational view of an aircraft of the type above referred to, to which one form of blade supporting means of the present invention has been applied;

Figure 2 is a fragmentary and somewhat diagrammatic view illustrating a portion of the rotor supporting structure, a portion of a sustaining blade, and the blade droop support illustrated as being applied to the craft of Figure 1, this view being on a substantially enlarged scale and including a showing of a blade in two different positions;

Figure 3 is a view similar to Figure 2 but illustrating a modified blade droop supporting structure and slack take-up device; and Figure 4 illustrates a still further application of various features of the present invention to the droop supports for a plurality of rotor blades.

The craft illustrated in Figure 1 comprises a fuselage 5 having laterally extended supplementary fixed wings 6, landing gear 7 and forward propelling means including a propeller 8. The sustaining rotor is mounted above the body or fuselage of the craft preferably on a plurality of upwardly converging leg members 9 which serve as a mounting structure for the rotor axis mechanism 10. The rotor is comprised of a plurality of sustaining blades 11 which are pivoted or articulated to the hub or axis structure 10 preferably on substantially vertically disposed pivot pins 12 as well as on substantially horizontally disposed pins 13, the two articulations being completed by the use of joint parts 14 which are attached to apertured ears or lugs 15 of the hub structure 10 by means of the pins 13. In this way, the blades are permitted freedom for movement both within as well as transversely of their general path of rotative travel to compensate for variations in flight forces.

The axis mechanism also serves to support an upwardly extended mast structure 16 to which the upper and inner ends of the blade droop supports 17 are secured. These droop supports are preferably made of flexible but substantially inextensible material such as braided wire cable and are extended from the mast 16, adjacent the top thereof, outwardly to be secured to the blades at points substantially spaced from the articulations thereof. The attachment to a blade may be by means of a bracket or fastening device 18 and, in order to permit adjustment in the effective length of these supporting elements, I preferably interpose a turnbuckle 19 adjacent to the mast.

As will be apparent from inspection of the drawings, the supporting elements 17 are arranged as "droop" supports. That is, they are arranged to support the blades when they are inactive or not rotating at a rate such that centrifugal force would prevent undue downward swinging or "drooping". The blades, of course, must be supported in this manner in order to prevent fouling thereof on any other portion of the craft such, for example, as the propeller 8.

When the rotor is operating at flight speeds of rotation the blades swing or cone upwardly under the influence of flight forces, with the result that the supporting cables 17 slacken or become loose. In this condition the cables have a tendency to vibrate or "whip", and, as a result, they impose irregular strains on the blades and their mounting structure and, in addition, the flexing causes fatigue in the cables and they rather quickly become frayed.

With the foregoing in mind, the present invention makes provision for taking up the slack or looseness in the supporting cables when the blades are operating at normal flight speeds of rotation. The device illustrated in Figures 1 and 2 includes an elastic or resilient member 20, which may take the form of a spring or, as here shown, may be made of rubber shock absorber cord. This device is secured to the supporting element at points spaced therealong as by means of wire or string windings 21. In the preferred arrangement, the points of attachment of the member 20 to the supporting element 17 are such that the former remains under tension (or in a distended condition) when the blade is at rest as well as during all normal upward and downward swinging movements of the blade during flight operation.

At this point it should be noted that in Figure 2 I have illustrated a blade 11, in full lines, in drooped position, and also the same blade in an upwardly angled position (see dotted line showing 11a). In the drooped position the blade is supported by the element 17, the member 20 preferably having sufficient stretch or give to permit the positive or fixed support of the blade in this position by the cable element 17. However, when the blade cones or swings upwardly under the influence of flight forces and the supporting cable 17 slackens, the elastic device 20 forms a slack-loop 17a in the cable 17 between the points of attachment 21. The slack or looseness, therefore, is "collected", so to speak, in a small loop, with the result that whipping of the cable is substantially eliminated.

Turning now to the device illustrated in Figure 3, it should be noted that here I have employed an elastic device 22 which is secured to the cable 17 at a point intermediate its ends and preferably at the joint 23 between the cable 17 proper and the turnbuckle 19. The elastic member 22 is extended from the point 23 downwardly and inwardly toward the base of the mast structure 16, i. e., adjacent the point of articulation of the blade to the axis 10. An attachment device 24 is provided at this point.

Figure 3 also includes a showing of a blade 11 in drooped position in which it receives support from the cable 17, the elastic device 22 being under tension and substantially extended in this condition. The dot and dash line showing of the blade 11a and cable 17b, in an upwardly coned position, illustrates the manner in which this slack take-up device operates. Here, it will be seen, the elastic member 22, reacting at an angle to the general extension of the cable 17, brings the point 23 to the position indicated at 23a. The length of the elastic member, the extensibility thereof and the arrangement of other parts, according to this form, are also relatively proportioned in such manner that the elastic member always remains under tension so that slack will be taken up in any normal blade movement in flight operation.

Figure 3 further illustrates a positive stop element 16a extended outwardly from the hub 16 to a point overlying the blade pivot 12. This stop neatly cooperates with other parts of the head structure including the attachment means for the elastic slack take-up device, and serves to limit excessive or abnormal upward swinging of the blade without interfering with proper operation of both blade pivots.

The structure illustrated in Figure 4 is still further modified over that described above in connection with Figures 1 to 3 inclusive. Here, I employ a resilient or elastic element 25 which interconnects the droop supports 17 for a plurality of blades at points 26 preferably disposed at the outer ends of the adjusting devices 19. The mast structure 16a, in this instance, is provided with a guide tube 27 adjacent the bottom or base thereof through which the elastic member 25 is extended and is free to move. These parts 25 and 27 are arranged to cooperate with the droop supports 17 of a pair of oppositely disposed blades. It will be understood that ordinarily four rotor blades are employed but that in Figure 4, as well as the other figures, the blade at the near side of the axis structure has been omitted for the sake of clarity in the drawings. More or less than four rotor blades may be used and in Figure 4 I have shown an elastic element 28, extended through a guide 29 arranged at right angles to the guide 27, for cooperation with the droop supports of the other pair of blades of a four bladed rotor.

According to the present invention, therefore, I provide for taking up slack or looseness in blade droop supporting cables by the use of elastic elements which are readily constructed as well as applied and which, at the same time, are constantly operative to take up slack regardless of blade position in flight on the vertical as well as the horizontal pivot pins, such movements being different at opposite sides of the rotor (that is, irregular as between blades), especially during forward or translational flight. The arrangements, furthermore, are such as not to interfere with the desired normal articulative blade movements.

All forms of the invention further have this advantage, to wit: that the support is a combined yieldingly-elastic and positive-stop device, so that sudden shocks are cushioned; and further that the tension increases as the blade approaches nearer to a position where it is positively stopped.

In considering the forms of this invention illustrated in Figures 1, 2 and 3, it should be noted that the action of the devices is independent for each blade. Damage, or the like, to the device of one blade, therefore, does not affect the action of the others.

The form illustrated in Figures 1 and 2 is advantageous in requiring a minimum number of parts, this structure, therefore, resulting in small total weight and parasite drag of the slack take-up parts themselves.

On the other hand, the structures of Figures 3 and 4 are efficient in view of the fact that they completely eliminate slack loops or the like, the result being elimination of a certain amount of parasite drag which would necessarily result from such loops. Still further, the device of Figure 3 results in disposition of the slack take-up parts closely adjacent the hub and mast structure. This arrangement is desirable as it further decreases drag.

Finally, in certain instances, it may be found to be desirable to employ an arrangement such as illustrated in Figure 4. This arrangement, it will be noted, requires the use of relatively elastic and connection members and, in addition, further decreases parasite drag by the disposition of certain parts within the mast structure itself. It will also be apparent, in view of the fact that in operation, in general, when one blade is in a "high" position the diametrically opposite blade is in a "low" position, that the degree of stretch of the elastic element is reduced; this reduction being further enhanced by virtue of the fact that the initial length of the elastic of this form is about twice that of the others, so that longer life of the elastic results.

I do not herein claim the landing gear illustrated in Figure 1, or certain other parts of the craft not described in detail herein. This landing gear is described and claimed in my copending application, Serial No. 528,280, filed April 7th, 1931.

What I claim is:

1. In combination with a pivotally and rotatably mounted aircraft sustaining blade, a blade droop supporting structure including an upwardly extended mast, jointed means interconnecting the mast and the blade arranged to permit upward swinging of the latter, and elastic slack take-up means associated with said interconnecting means adjacent a joint thereof.

2. In combination with a pivotally and rotatably mounted aircraft sustaining blade, a blade droop supporting structure including an upwardly extended mast, means interconnecting the mast and the blade constructed to permit upward swinging of the latter, and elastic slack take-up means associated with the interconnecting means at a point intermediate the mast and the blade, the slack take-up means being arranged to react between the said interconnecting means and a part adjacent the base of said mast.

3. In combination with a pivotally and rotatably mounted aircraft sustaining blade, a blade droop supporting structure including a flexible supporting element arranged to slacken upon upward swinging of the blade, and an elastic device associated with said element to take up slack, said device including an elastic member arranged to react at an angle to said element.

4. An aircraft sustaining rotor including a plurality of pivotally and rotatably mounted blades, and blade droop supporting means including a flexible supporting element for each blade arranged to slacken upon upward swinging of the blades, and an elastic slack take-up device for each element, each of said devices including an elastic member arranged for independent reaction at an angle to its associated element.

5. In combination with a pivotally and rotatably mounted aircraft sustaining blade, blade droop supporting means including a mast structure extended above at least a portion of the blade, a flexible blade supporting element extended to said mast structure in an upper portion thereof and arranged to slacken upon upward swinging of the blade, and a slack take-up device arranged to react between a point adjacent the base of said structure and a point on said element intermediate its ends.

6. An aircraft sustaining rotor including a plurality of pivotally and rotatably mounted blades, and blade droop supporting means including a flexible supporting element for each blade arranged to slacken upon upward swinging of the blades, and a slack take-up device arranged to react between a plurality of blade supporting elements.

7. An aircraft sustaining rotor including a plurality of pivotally and rotatably mounted blades, and blade droop supporting means including a flexible supporting element for each blade arranged to slacken upon upward swinging of the blades, and a slack take-up device arranged to react between a plurality of blade supporting elements at an angle to each.

8. An aircraft sustaining rotor including a plurality of pivotally and rotatably mounted blades, and blade droop supporting means including a mast structure extended above at least a portion of the blades, a flexible supporting element for each blade extended to said mast structure and arranged to slacken upon upward swinging of the blades, and slack take-up means for a plurality of said supporting elements including an elastic connection therebetween.

9. An aircraft sustaining rotor including a plurality of pivotally and rotatably mounted blades, and blade droop supporting means including a mast structure extended above at least a portion of the blades, a flexible supporting element for each blade extended to said mast structure and arranged to slacken upon upward swinging of the blades, and slack take-up means for a plurality of said supporting elements including an elastic connection therebetween extended through said mast structure.

10. In an aircraft sustaining rotor, a mounting structure, a sustaining blade flexibly connected therewith for upward and downward swinging movements, and a blade droop support including a substantially inextensible but transversely flexible element arranged to positively support the blade when it is inactive in a substantially predetermined position, in which construction said element slackens by transverse flexure when the blade swings upwardly, and elastic means associated with said element to take up slack therein when the blade swings upwardly from said predetermined position, the strength or reaction of said elastic means being insufficient to materially affect the positive support of the blade by said inextensible element when the blade is inactive.

11. In an aircraft, a sustaining rotor including rotative blade or wing means, a hub structure, flexible attachment means securing the blade means to the hub structure providing for upward and downward swinging movement of the blade means under the influence of flight forces, a mechanism for supporting a blade when it is not rotating at flight speed including a transversely flexible element connected with the blade and constructed and arranged to flex transversely and thus slacken upon upward swinging of the blade, and slack take-up means connected with said element at a point closely adjacent the hub structure and constructed and arranged to concentrate the slack due to transverse flexure at said point.

AGNEW E. LARSEN.